United States Patent [19]
Wight et al.

[11] Patent Number: 4,664,234
[45] Date of Patent: May 12, 1987

[54] SELF PRESSURIZED DAMPER

[75] Inventors: Robert D. Wight; Carlyle H. Wokasien, both of Dayton, Ohio

[73] Assignee: General Motors Corporation, Detroit, Mich.

[21] Appl. No.: 790,954

[22] Filed: Oct. 24, 1985

Related U.S. Application Data

[63] Continuation-in-part of Ser. No. 605,582, Apr. 30, 1984, abandoned.

[51] Int. Cl.$^4$ .............................................. F16F 9/43
[52] U.S. Cl. ......................... 188/322.21; 29/434; 29/460; 141/11; 141/82
[58] Field of Search ............... 141/3, 4, 5, 9, 11, 141/20, 69, 82; 53/428, 432; 188/269, 315, 320, 322.21; 267/64.28; 29/434, 460

[56] References Cited
U.S. PATENT DOCUMENTS

| | | | |
|---|---|---|---|
| 2,367,977 | 1/1945 | Thornhill | 188/269 X |
| 2,774,446 | 12/1956 | deCarbon | 188/317 |
| 3,024,875 | 3/1962 | Stultz . | |
| 3,750,855 | 8/1973 | Peddinghaus | 188/269 |
| 3,945,663 | 3/1976 | Duckett | 188/315 |
| 4,372,429 | 2/1983 | Marx | 188/322.12 |

FOREIGN PATENT DOCUMENTS

| | | |
|---|---|---|
| 2027152 | 12/1971 | Fed. Rep. of Germany . |
| 2641593 | 3/1978 | Fed. Rep. of Germany . |
| 86644 | 5/1982 | Japan .............................. 188/322.21 |

OTHER PUBLICATIONS
Bilstein brochure (printed Aug. 1983), Brake & Front End—Jul. 1982—pp. 17 & 18.

Primary Examiner—Duane A. Reger
Attorney, Agent, or Firm—Lawrence B. Plant

[57] ABSTRACT

A method of making a pressurized shock dampening device, and the device so made wherein: a gas-generating, thermally decomposable substance is placed in the gas chamber of the device at the time of its assembly; the device is filled with hydraulic fluid and sealed; and thereafter the device is heated up to the thermal decomposition temperature of the substance to decompose it inside the device so as to increase the pressure in the gas chamber to at least two atmospheres. A preferred device includes a super atomspherically pressurized gas chamber defined by a bladder which is incommunicado the exterior of the device.

2 Claims, 4 Drawing Figures

SELF PRESSURIZED DAMPER

This is a continuation-in-part of U.S. Ser. No. 605,582 filed Apr. 30, 1984 now abandoned.

This invention relates to pressurized, hydraulic, shock dampening devices (e.g., automobile shock absorbers or shock dampening struts) and a method of pressurizing same.

BACKGROUND OF THE INVENTION

A typical hydraulic shock dampening device (hereafter damper) comprises essentially: a working cylinder filled with hydraulic fluid (hereafter oil); and a gas-charged reservoir adjacent the working cylinder which receives and dispenses oil from and to the working cylinder during the damper's compression and rebound strokes respectively. The working cylinder comprises a damping piston axially slidable within a close fitting surrounding tube. The piston has appropriate passages therethrough and damping valves therein which control the flow of oil from one side of the piston to the other as it reciprocates within the tube. One end of the working cylinder is sealed shut and about the piston rod while the other end communicates with the reservoir to permit oil to shuttle back and forth between the working cylinder and the reservoir as required. The reservoir contains a chamber full of a cushioning gas which compresses during the damper's compression stroke and expands during the damper's rebound stroke in order to accommodate the otherwise incompressible oil flowing from and to the working cylinder. The expansion and compression of the gas cushion also accommodates the expansion and contraction of the hydraulic oil at various temperatures. In so-called "single tube" dampers, the reservoir is aligned axially with the working cylinder and is usually defined by a simple extension of the same tube that defines the working cylinder. In so-called "double tube" dampers, the working cylinder is surrounded by a radially spaced second tube (known as the reservoir tube) and the annular space therebetween becomes the reservoir.

It is known to physically separate the oil from the cushioning gas in the reservoir in order to prevent the gas from aerating and foaming the oil. In this regard, aeration of the oil with cushioning gas is the primary cause of a condition known as "lag" which is lost motion occurring in the damping piston due to the presence of compressible hydraulic fluid (i.e., the aerated oil) in the working cylinder. One manufacturer (i.e., of single tube dampers), positions a floating piston between the gas and the oil in the reservoir to isolate one from the other. Other manufacturers package the cushioning gas in a hermetically sealed, gas-filled bladder which is submerged in the oil in the reservoir. One such bladder-containing damper of the double-tube type is disclosed in Stultz U.S. Pat. No. 3,024,875, which is assigned to the assignee of the present invention and is specifically incorporated herein by reference. Generally speaking Stultz discloses a Freon-filled bladder made from thin nylon or Mylar sheets sealed together along their edges. Assemblywise, Stultz's bladder is: filled with approximately one atmosphere (i.e., room temperature and rod extended) of Freon; curled; and inserted into the reservoir tube. Thereafter, the working cylinder is inserted into the center of the curled bladder and oil poured to overflowing into both the cylinder and the reservoir. The cylinder and reservoir tubes are then capped and welded closed. The cap for the working cylinder includes appropriate passages and valving for communication with the surrounding reservoir. In more recent years $SF_6$ gas has been used in place of Freon.

It is also known to pressurize the cushioning gas pocket to superatmospheric pressures ranging from about 2 to about 20 atmospheres. Pressurization helps to reduce lag due to reservoir gas-oil mixing (i.e., in bladderless dampers) and also reduces a condition known as "cavitational" lag which otherwise occurs in both bladder-type and bladderless dampers. Cavitational lag results from vaporization of the oil in the damper and subsequent aeration of the oil with the oil vapor. Superatmospheric pressurization not only reduces the amount of vapor that is formed but also so shrinks the size of the bubbles that are formed as to render them virtually harmless, lag-wise. Finally, superatmospheric pressurization imparts gas-spring characteristics to the damper which supplement the primary springs of the vehicle for improved control and handling of the vehicle.

A number of techniques for superatmospherically pressurizing dampers are known. One technique, for example, charges a single tube damper (i.e., with axially aligned reservoir and a floating oil-gas separating piston) by means of a special fixture sealingly secured to the open end of the tube defining the cylinder and reservoir. The fixture holds the floating and working pistons away from the mouth of the tube while the cushioning gas is pumped into the tube to a predetermined first pressure. Thereafter: (1) the floating and working pistons are pushed into the tube to compress the gas to a second predetermined working pressure; (2) the operating oil is pumped in behind the working piston; (3) the tube is sealed closed; and (4) the special fixture is removed. Another technique fully assembles a bladderless double-tube damper and then pressurizes it by: piercing the reservoir tube; injecting the cushioning gas under pressure into the reservoir; and finally welds shut the pierced hole. Still another technique (i.e., for bladder-type, double-tube dampers) provides a special sealable fitting through the wall of the reservoir tube and the bladder through which cushioning gas is pumped into the bladder from an external source after the damper has been filled and sealed (e.g., see Duckett U.S. Pat. No. 3,945,663).

The aforesaid pressurizing techniques are not only unnecessarily complicated and require special equipment but cannot be used effectively to pressurize bladder-type dampers such as Stultz U.S. Pat. No. 3,024,875 (supra) where the bladder is completely submerged in the reservoir oil so as to be incommunicado the outside of the damper. Moreover, existing practices for stuffing low pressure (i.e., atmospheric) bladders into reservoirs prior to filling and sealing cannot be used with bladders which are distended by high prepressurization. This is especially true with Stultz-like bladder-type, double-tube dampers where the bladder is curled to facilitate stuffing and positioning around the working cylinder. Even if it were practical to properly position highly prepressurized bladders in the reservoirs, special equipment would then be necessary to fill the dampers with pressurized oil and to seal them while still under pressure.

Accordingly, it is an object of the present invention to provide an ultrasimple method for manufacturing a high pressure, shock dampening device wherein superatmospheric pressure cushioning gas is generated in situ after the device is assembled by the thermal decomposition of a substance placed in the device during assembly. It is a further object of the present invention to provide a superatmospheric pressure, bladder-type shock dampening device wherein the bladder is completely submerged in the oil and incommunicado the exterior of the device. This and other objects and advantages of the present invention will become more readily apparent from the detailed description thereof which follows.

BRIEF DESCRIPTION OF THE INVENTION

The present invention comprehends a unique method for the in situ, self-pressurization of a gas-charged hydraulic damper to superatmospheric pressures (i.e., at room temperature) and a device produced thereby. More specifically, the invention comprehends positioning a dormant (i.e., stable at the temperatures of the assembly operation) gasifiable substance(s) in the damper's reservoir which substance, when heated to an activation temperature above the assembly temperatures, will undergo a chemical change to generate a superatmospheric pressure of a noncondensible gas inside the damper after it has been filled and sealed shut. It is to be understood that the term "noncondensible" gas is not used herein in the absolute sense, but rather is used to mean a gas which will not condense under the normal operating conditions (i.e., temperature and pressure) of the damper. The device will include means (e.g., bladder or piston) defining an expansible gas-filled chamber which chamber contains the pressurizing gas and its dormant precursor prior to actuation. While the following discussion will be in terms of the most preferred embodiment wherein the thermally decomposable substance is contained in a bladder, it is to be understood that the invention also extends to devices employing a piston, or the like, separating the gas-filled chamber from the fluid. The use of bladders is preferred because they: (1) allow greater flexibility in designing the device, (2) offer a simple way to handle the decomposable substance in the plant to prevent contamination and possible premature decomposition, and (3) serve to contain any solid residue from the decomposition reaction which could contaminate the hydraulic fluid and possibly affect the operation of seals and valves in the device.

The thermally decomposable substance(s) are stable at the assembly temperatures of the device and will remain dormant until after the device is filled with oil, sealed shut, and thereafter heated to the decomposition temperature of the substance. It is most preferred to employ such substances which are decomposable at temperatures of about 140° F. to 150° F. which occur within the device during the normal painting and drying cycle of the damper. Other higher activation temperatures may, of course, be used depending on which decomposable substance is chosen for each application.

The thermally decomposable substance may be any of a number of well known material(s) such as the alkali metal azide (e.g., sodium azide) propellants, or the chemical foaming agents commonly used to foam plastics. The former generate nitrogen, are well known as inflators for vehicular air bag systems, and may be blended with appropriate binders and/or diluents to control their rate of decomposition/gasification as well as their activation temperature. Chemical foaming agents undergo a chemical transformation when producing the gas and include such well known plastic foaming agents as are described in various publications (e.g., *Modern Plastics Encyclopedia*, 1982–83, McGraw Hill, pp 176–180).

The bladder defining the cushioning gas pocket will contain enough of the dormant decomposable substance to generate at least about 0.08 moles of substantially noncondensible gas per liter of bladder volume (i.e., at room temperature) so as to raise the room temperature pressure in the bladder to at least about 2 atmospheres and upwards to as much as about 10 atmospheres. For example, in its unpressurized state the bladder can be inserted into the damper in exactly the same manner as before. By the simple application of heat, the damper is pressurized and all without recourse to superfluous external pressurizing means, fixtures, fittings, etc. The resulting product has its bladder immersed completely in the reservoir oil and is completely incommunicado the exterior of the damper.

DETAILED DESCRIPTION OF ONE SPECIFIC EMBODIMENT OF THE PRESENT INVENTION

Figure 1:
FIG. 1 depicts, in partial section, a prior art, bladder-type, double-tube shock absorber with its working piston near the end of its compression stroke.
Figure 2:
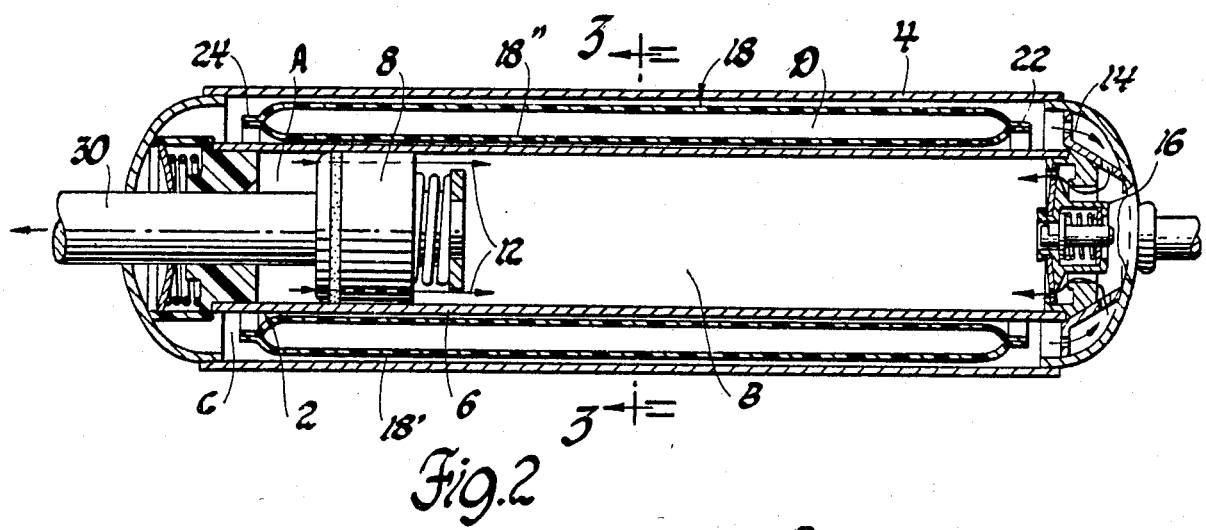
FIG. 2 depicts the shock absorber of FIG. 1 with its working piston near the end of its rebound stroke.
Figure 3:
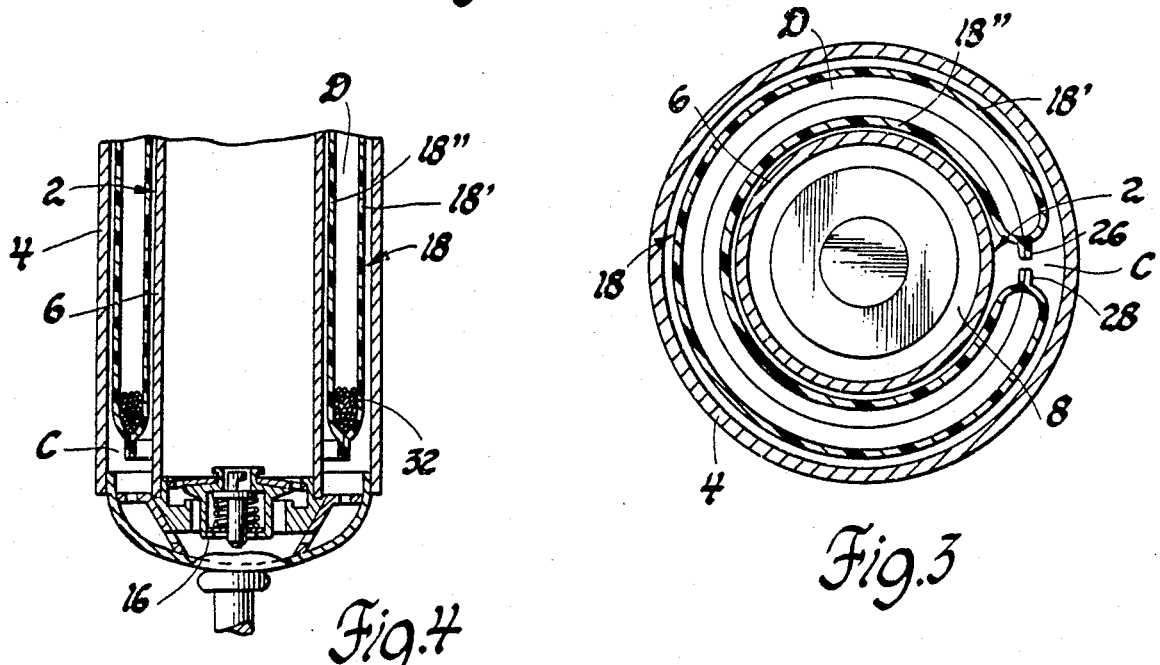
FIG. 3 is a section taken in the direction 3—3 of FIG. 2.

FIGS. 1–3 depict a simple, bladder-type, double-tube shock absorber comprising essentially a working cylinder 2, a surrounding reservoir tube 4 and an annular reservoir chamber C therebetween, and will serve to illustrate the basic structure and operation of gas-filled hydraulic dampers in general. The working cylinder 2 comprises a tube 6 defining working chambers A and B which are separated one from the other by a damping piston 8. Damping piston 8 contains appropriate internal passages and damping valves (not shown) for controlling the flow of hydraulic oil between chambers A and B as indicated by the arrows 10 and 12. In FIG. 1 the working piston 8 is shown near the end of its compression stroke and the arrows 10 show the oil flowing from the compression control chamber B through the piston 8 into the rebound control chamber A. Any excess oil in the compression control chamber B is forced into the reservoir chamber C (see arrows 14) via an appropriate valving arrangement 16 at the end of the working cylinder 2. The reservoir chamber C contains a substantially atmospherically pressurized bladder 18 which defines an expansible, cushioning-gas-containing chamber D such as described in Stultz supra. During the compression stroke the gas in chamber D is compressed to accommodate the oil flowing into the reservoir C from the cylinder 2. The bladder 18, here depicted, comprises simply two sheets of gas-impermeable plastic 18' and 18" which are heat sealed together along their edges 22, 24, 26 and 28. During assembly, the bladder is curled to fit inside the reservoir tube 4 and the working cylinder 2 thereafter inserted into the center of the curled bladder 18. The working cylinder and reservoir C are then completely filled with oil so that the atmospherically pressurized bladder 18 is totally immersed within the hydraulic fluid in the reservoir C and has no means for communicating with the outside of the shock absorber (i.e., incommunicado the ambient).

FIG. 2 shows the shock absorber of FIG. 1 near the end of its rebound stroke wherein the rod 30 attached to the piston 8 is in substantially its fully extended position. As the piston 8 moves through its rebound stroke, oil from the rebound chamber A flows through the piston 8 into the compression chamber B as indicated by the arrows 12. At the same time, the excess hydraulic oil earlier dumped into the reservoir C during compression is now returned to the compression chamber B via the valving arrangement 16 due to the force exerted by expansion of the gas in the cushioning gas pocket D earlier compressed in the compression stroke.

Figure 4:
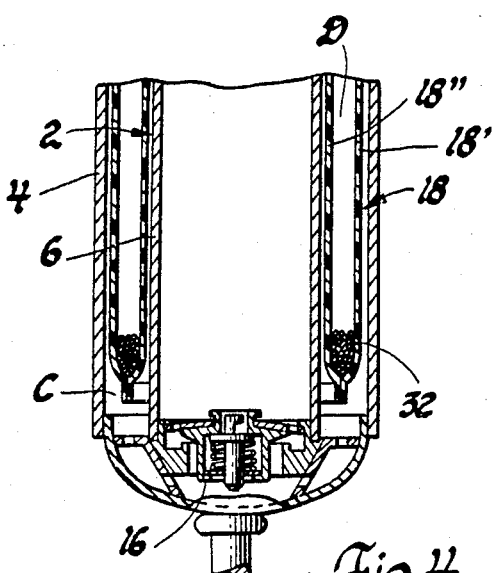
FIG. 4 is a partial view of a shock absorber like that shown in FIG. 2 depicting one embodiment of the present invention.

FIG. 4 illustrates a prior art damper like that shown in FIGS. 1–3 which is provided with superatmospherically self-pressurizable bladder in accordance with the preferred embodiment of the present invention. The shock absorber is assembled in substantially the same manner as dampers having atmospherically pressurized bladders but wherein the bladder 18 also contains pellets 32 of the thermally decomposable substance of the present invention. After sealing of the tubes 2 and 4, the shock absorber is heated to decompose the substance and pressurize the bladder 18 to a desired superatmospheric pressure between about 2 and 10 atmospheres (at room temperature). Alternatively a single larger pill of the thermally decomposable substance may be substituted for the pellets.

In one specific example of the process, a double tube shock absorber was chemically self pressurized as follows. A shock absorber of the type shown essentially in Stultz supra was made according to the standard commercial practice of the assignee but the $SF_6$-filled nylon bladder was replaced with an air-filled nylon bladder (i.e., one atmosphere at room temperature) containing three propellant pills supplied by Inflation Systems International Co. Each pill had a diameter of about 13 mm, a thickness of about 5.5 mm and weighed one gram (including about 40% alkali metal azide, and the remainder binder/diluents). The bag had a room temperature, atmospheric pressure, volume of about 75 cc and the shock absorber was filled to overflowing with about 185 cc of hydraulic fluid before sealing. With its rod fully extended the shock absorber was placed in a 300° F. oven for three hours and then allowed to cool back down to room temperature. The shock absorber was then tested by loading the rod sufficiently to push the rod completely into the working cylinder so as to compress the $N_2$ gas generated in the reservoir by the azide decomposition. This test showed that the decomposition of the azide had pressurized the shock absorber to 30 psi.

In another example of the process, the reservoir tube of the shock absorber described in the first example was fitted with a pressure gauge and the bladder charged with five grams each of ammonium carbonate and copper sulfate (for gettering $NH_3$) The shock absorber was heated for five (5) hours in a 200° F. oven. At that time the gauge showed a pressure of 230 psi. The shock absorber was then cooled to room temperature and exhibited a rod extended pressure of 105 psi and a rod retracted pressure of 180 psi.

While the invention has been described primarily in terms of a bladder-type, double-tube shock absorber, it is to be understood that the principles involved therein are equally applicable to other pressurized dampers as well. In fact, it is especially applicable to single tube dampers whose reservoirs may contain cylindrical or spherical bladders or other means (e.g., floating piston) defining an expansible gas-filled chamber which is self-pressurized in accordance herewith. Hence the invention is not limited to the specific embodiments described herein but rather only to the extent set forth hereafter in the claims which follow.

The embodiments of the invention in which an exclusive property or privilege is claimed are defined as follows:

1. A method of making a pressurized double-tube shock dampening device having a central working cylinder and a reservoir tube surrounding said working cylinder in radially-spaced relation thereto so as to define therebetween a reservoir for receiving and dispensing hydraulic fluid from and to the cylinder in the operation of the device comprising the steps of:
    positioning an hermetically-sealed, gas-filled bladder in said reservoir about said cylinder, said bladder being incommunicado the exterior of the device and containing a sufficient quantity of an alkali metal azide to generate at least about two room temperature atmospheres of nitrogen pressure in said bladder upon decompostion thereof;
    substantially filling said cylinder and said reservoir with said hydraulic fluid;
    sealing said cylinder and said tube to contain said fluid; and
    thereafter heating said device at a temperature sufficient to decompose said azide and form said nitrogen during the painting and drying cycle of said device.

2. A method of making a pressurized shock dampening device having a piston and rod assembly reciprocable within a hydraulic-fluid-filled working cylinder and a gas-filled region adjacent said cylinder for exerting constant pressure on said fluid in said cylinder during the operation of the device comprising the steps of:
    positioning an hermetically-sealed, gas-filled bladder in said region, said bladder (1) defining said region (2) being incommunicado the exterior of said device and (3) containing a dormant gasifiable substance which is stable at the temperatures of the assembly operation and thermally decomposable at an elevated activation temperature which is above said assembly temperatures but below the maximum temperature experienced by said device during subsequent normal painting and drying operations;
    substantially filling said cylinder and said reservoir with said hydraulic fluid;
    sealing said cylinder and said reservoir to contain said fluid; and
    thereafter heating said device during painting and drying to a temperature of at least said activation temperature to decompose said substance, from said non-condensable gas and pressurize said bladder to at least about two atmospheres as measured at room temperature.

* * * * *